United States Patent
Griffiths et al.

(10) Patent No.: US 6,543,857 B1
(45) Date of Patent: Apr. 8, 2003

(54) VEHICLE AXLE

(75) Inventors: Paul John Griffiths, Guilden Sutton (GB); David James Fanning, Corwen (GB)

(73) Assignee: Meritor Heavy Vehicle Systems Limited, Wrexham (GB)

(*) Notice: Subject to any disclaimer, the term of this patent is extended or adjusted under 35 U.S.C. 154(b) by 0 days.

(21) Appl. No.: 09/694,116

(22) Filed: Oct. 20, 2000

(51) Int. Cl.⁷ .............................................. B60B 35/00
(52) U.S. Cl. .................................... 301/127; 301/124.1
(58) Field of Search .............................. 301/127, 124.1, 301/124.2; 280/124.108, 124.109, 124.153

(56) References Cited

U.S. PATENT DOCUMENTS

| | | | |
|---|---|---|---|
| 1,784,856 A | 12/1930 | Urschel | 301/124.1 |
| 2,028,394 A | 1/1936 | Kay | 301/127 |
| 2,218,127 A | 10/1940 | Urschel | 301/124.1 |
| 3,072,441 A | 1/1963 | Schilberg | 301/124.1 |
| 3,804,467 A | 4/1974 | Austermann | 301/127 |
| 4,192,396 A | 3/1980 | Austermann, Jr. et al. | 301/127 |
| 4,787,680 A | 11/1988 | Bonjean et al. | 301/124.1 |
| 4,813,507 A * | 3/1989 | Tanaka et al. | 172/508 |
| 4,830,400 A | 5/1989 | Penot | |
| 4,951,962 A * | 8/1990 | Tomida et al. | 280/124.108 |
| 5,303,985 A | 4/1994 | Barnholt et al. | |
| 5,324,073 A * | 6/1994 | Alatalo et al. | 228/144 |
| 5,409,255 A * | 4/1995 | Alatalo et al. | 228/144 |
| 5,411,286 A | 5/1995 | Pittman | 301/127 |
| 5,429,423 A | 7/1995 | Pollock et al. | 301/124.1 |
| 5,518,265 A * | 5/1996 | Buthala et al. | 280/124.166 |
| 5,520,407 A * | 5/1996 | Alatalo et al. | 228/144 |
| 5,664,847 A | 9/1997 | Bear et al. | 301/124.1 |
| 6,086,162 A | 7/2000 | Pinch et al. | 301/124.1 |
| 6,099,084 A | 8/2000 | Bungarten et al. | 301/127 |

FOREIGN PATENT DOCUMENTS

| | | |
|---|---|---|
| EP | 0 650 860 | 10/1994 |
| GB | 307 427 | 7/1929 |
| GB | 2 154 186 | 9/1985 |

OTHER PUBLICATIONS

International Search Report dated Feb. 6, 2001.

* cited by examiner

*Primary Examiner*—S. Joseph Morano
*Assistant Examiner*—Long Bao Nguyen
(74) *Attorney, Agent, or Firm*—Carlson, Gaskey & Olds

(57) ABSTRACT

A vehicle axle, for example for a driven; undriven, steering or trailer system, comprises a member (1) formed as a hollow monocoque structure which includes at least one integral location (3, 20, 23) formed in the structure as a low stress area adapted to receive an attachment (24, 31, 34) thereto for use of the axle in a vehicle. The monocoque structure may be rigid, or substantially so, or it may include one or more compliant portions. It distributes throughout the member stresses to which the member is subjected when the axle is use in a vehicle and parts of the structure may be specifically shaped to suit the particular stresses to which they will be subjected when in use.

In one embodiment the monocoque structure includes an axle beam part of a hollow lobed cross-section which gives roll compliance without necessarily having to add resilient components. In this embodiment trailing arms (4) are formed as an integral part of the monocoque structure which forms part of a trailing suspension system.

35 Claims, 3 Drawing Sheets

VEHICLE AXLE

The present application claims priority to British Application Serial No. GB 9925415.3, filed Oct. 28, 1999.

This invention relates to a vehicle axle and is applicable to an axle of a drive, undriven, steering or trailer system.

Conventionally, vehicle axles are built-up constructions. For example, an axle may comprise an axle beam formed as a member to which separately made side members are welded or bolted which in turn have components secured to them by fastenings or welding to provide, for example, spring seatings, trailing arms, suspension attachments and brake backplates. The member forming the axle beam may itself be of a composite construction. When the axle is a drive axle a housing of a final drive and differential assembly may be secured to the axle beam as a separate component.

The separate manufacture of component-parts and assembly into the axles makes these built-up constructions costly and time consuming to produce. Also the built-up axles can be relatively heavy.

The present invention seeks to avoid or at least reduce the amount of building up required in the production of a vehicle axle.

According to the present invention a vehicle axle is provided which comprises a member formed as a hollow monocoque structure which includes at least one integral location formed in the structure as a low stress area to receive an attachment thereto for use of the axle in a vehicle.

There may be a plurality of the integral locations formed as low stress areas in the monocoque structure to receive attachments.

The monocoque structure may be rigid or substantially so, or it may include one or more compliant portions.

The monocoque structure distributes throughout the member stresses to which the member is subjected when the axle is in use in a vehicle. Parts of the structure can be specially shaped to suit the particular stresses to which they will be subjected when the axle is in use. For example, a part which is to withstand bending forces may have its hollow cross-section extended in the direction, or main direction, in which such forces are exerted on the part. A part which needs to be torsionally compliant in use of the axle may be of angled or lobed hollow cross-section although round, oval, triangular, square or rectangular cross-sectional shapes are possible but more limited in the extent of the compliance that may be obtained. Where the structure includes an axle beam part, for example, that part is preferably of a hollow T-shaped cross-section disposed on its side for especially advantageous torsional compliance whilst providing stiffness and strength against vertical and horizontal bending forces. The hollow T-section can absorb movement under applied load but a substantial art of its torsional compliance may be provided by elastic deforming, or warping, of the section. A particular advantage which this gives is roll compliance without necessarily having to add rubber or other resilient component such as are usually relied upon in conventional axle structures. A three or more lobed cross-section may provide comparable characteristics. A round or other non-lobed cross-section, on the other hand, whilst providing compliance from strain within the material may permit little or no warping.

The wall thickness of the monocoque structure may be varied at different parts of the structure to suit the strength and/or stiffness and torsional compliance requirements of the parts.

The monocoque structure may be made of metal, for example steel, or possibly a suitable composite material. It may be formed in one piece or it may be in two or more pieces which are fixed together to provide the single structure. When formed in one piece the structure may, for example, be blown or investment cast to shape. When formed in two or more pieces, the pieces may, for example, be cast, moulded or pressed to shape and then fixed together, as by welding or bonding, into the single structure.

Preferably the structure is rounded where walls thereof meet so as to avoid sharp corners, angles or edges which might give rise to undesirable stress points.

The strength provided by the monocoque structure enables the member to be made with a wall thickness less than has generally been necessary in members which are made for the conventional built-up vehicle axles. In consequence, there can be a significant saving in weight, without loss of stiffness and strength requirements, in a vehicle axle according to the present invention over a conventional built-up axle for similar use. This is particularly advantageous in view of the general desire of vehicle manufacturers to reduce the unladen weight of vehicles. A stub axle or axles may be formed in one with the member or be a separately made component or components fixed to the member. If the axle is made as a drive axle, the rigid member may include a cavity for a drive and differential gearing assembly.

An axle in accordance with the present invention may be included in various systems. It may, for example, be included in a parallelogram structure in which it may provide a cross beam and the monocoque structure may have integrally formed in it cantilever beams above and below its central horizontal axis, as installed for use, which may, for example, have ends formed to accept welded bosses. Another example of use of the axle may be in a multilink beam axle suspension in which links are formed integrally with the monocoque structure. The axle may also be used in a trailing, semi-trailing or leading arm suspension system for which an arm or arms may be formed as an integral part of the monocoque structure. The monocoque structure may then provide a combination of axle and anti-roll functions. The or each arm may have a bush housing for a bearing formed in one with it, or a bush housing may be secured, for example by welding, to the arm. If the monocoque structure is formed with a pair of similarly directed arms it can be advantageous to have bearing bush housings made as separate components which are secured to the arms as this allows adjustment of the spacing of the bushes to suit the intended installation of the axle.

The or each integral location of the monocoque structure for an attachment may comprise, for example, a hollowed, raised or levelled portion of the structure as may be suitable for any one of various attachments for use of the axle in a vehicle.

For example, the location or locations may include: a mounting for a suspension spring or springs; anchorage for a damper and air spring unit: support for a stub axle or axles, a pivot bearing or bearings and/or for disc or drum brake mountings; a mounting or mountings for an air cylinder for a drum or disc brake; bearing for a brake camshaft; and locations for an ABS sensor and/or for attachment of brackets to receive trailing and/or leading links and/or anti-roll bars. When the axle includes arms adjacent opposite ends of an axle beam, supports for brake brackets may be provided conveniently at the juncture of the arms with the axle beam, away from the load part of the beam.

The vehicle axle may comprise more than one of the monocoque structures. Thus, for example, the axle may have one of the structures in one half of its length and another one in the other half of its length. The two structure may be connected together directly, or they may be secured to an intermediate section which may be rigid or flexible. Use of an intermediate section allows for length adjustment of the axle by selection of the size of the intermediate section rather than having to vary the size of the monocoque structures.

A vehicle axle in accordance with the present invention may be provided as original equipment in a vehicle in a vehicle, or be fitted as a replacement part in a vehicle.

According to a second aspect of the present invention a vehicle is provided which includes an axle in accordance with the first aspect of the invention as herein set forth.

An embodiment of the invention will now be described by way of example only with reference to the accompanying drawings, in which.

Figure 1:
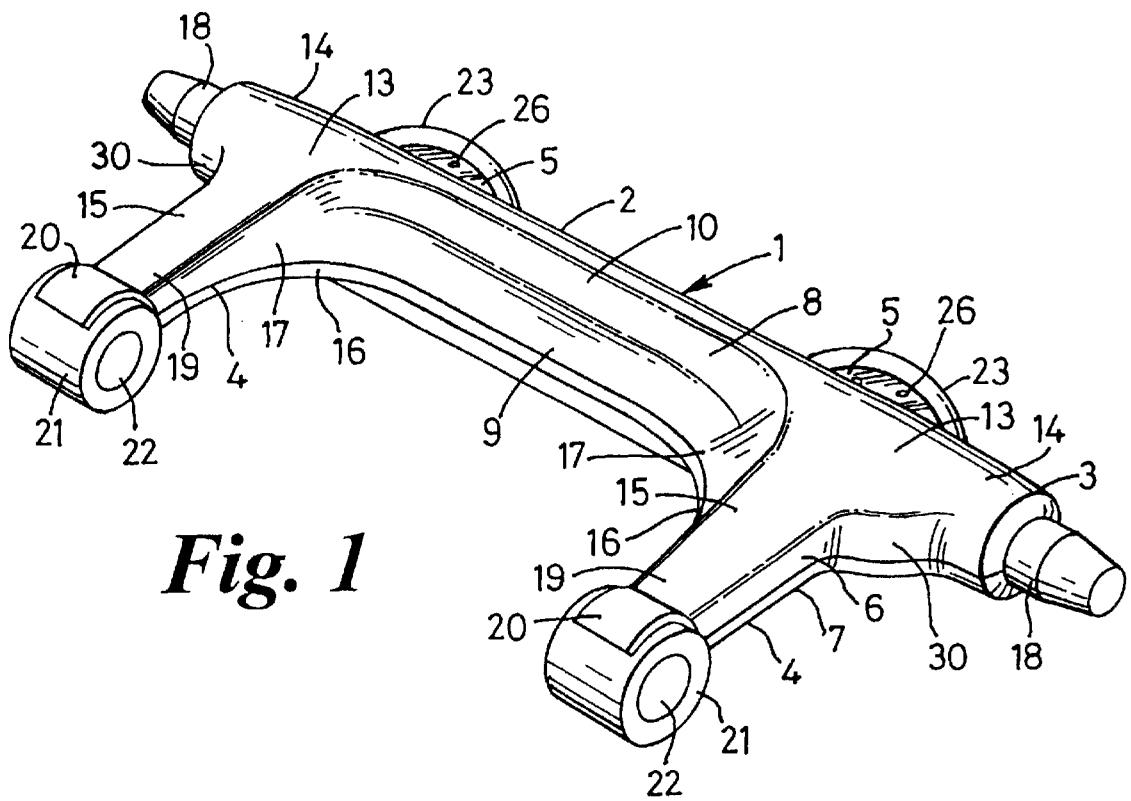
FIG. 1 is a top perspective view from the rear of an axle in accordance with the present invention.

In this embodiment the invention is applied to an axle of a beam axle trailing arm suspension for a trailer vehicle.

The axle comprises a member 1 which is formed as a hollow monocoque structure shaped to define, all in the one structure, an axle beam 2, stub axle supports 3 at opposite ends of the axle beam, a pair of trailing arms 4 near the ends of the axle beam, seatings 5 for air springs and locations for various other fittings on the axles as will be described below. The monocoque structure is formed by two, top and bottom, half shells 6, 7 which match and are welded together at a central horizontal plane of the structure. The half shells 6, 7 are made as steel castings.

Figure 3:
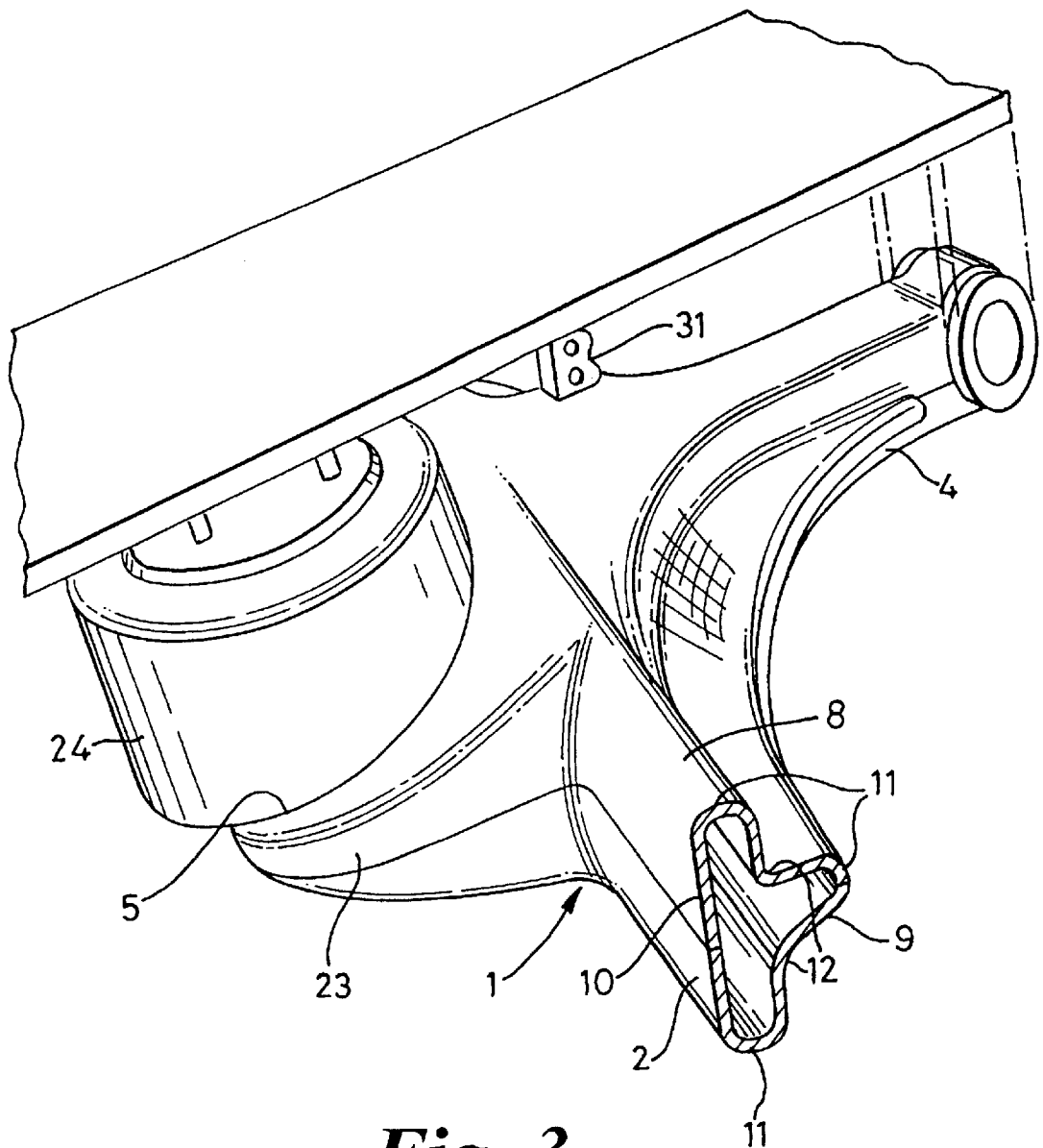
FIGS. 3 and 4 are respectively top and underneath perspective view from the front of part of the axle shown attached to a chassis member of a vehicle.

The axle beam 2 has a central, main, part 8 of a hollow, generally T-shaped cross-section, as best seen in FIG. 3, disposed on its side so that a stem portion 9 and a cross-portion 10 of the T-shape are respectively substantially horizontally and vertically disposed, with the central horizontal plane of the stem portion 10 coincident with the central horizontal portion of the monocoque structure. Free ends 11 of the stem and cross-portions 9, 10 are convexly rounded and corners 12 between the stem and cross-portions are concavely rounded to minimise stress concentration in those areas when the axle is in use. The T-shaped section provides the axle beam with stiffness and strength to withstand bending forces imposed on the axle in use in generally vertical and horizontal directions whilst giving the axle beam substantial torsional compliance and permitting warping of the axle beam for roll compliance.

From the central part 8 the generally T-shaped cross-sectional of the axle beam merges gradually, with curving contours, into rigid end parts 13 which are each of a generally L-shaped disposed on its side with the heel of the L adjacent to the central part. A first limb 14 of the L-shape of each end part 13 is of a substantially circular hollow cross-section of an external diameter such as to be contained within the depth of the cross portion 10 of the T-shaped section of the central part. That limb 14 extends co-axially with the central part of the axle beam. A second limb 15 of the L-shape extends in the same direction as the stem portion 9 of the central part and it of a substantially rectangular hollow cross-section adjacent to the first limb 14, modifying to a substantially square hollow cross-sections as it extends away from the first limb. The elongation of the rectangular cross-section is lengthwise of the central part 8. Depthwise the second limbs 15, like the first limbs 18 are contained within the depth of the cross-section 10 of the central part. Both the rectangular and square cross-sections of the second limbs 15 have well-rounded corners. The central horizontal axles of the second limbs of the end parts 13 are parallel and lie in the central horizontal plane of the stem portion of the central part 8. As the central part approaches the end parts 13 the stem portion 9 projects increasingly from the cross-portion 10 so as to merge with the second limbs 15 of the end parts in generously sweeping arcs 16. The stem portion, therefore, affords a web 17 between each end part and the central part which reinforces the second limbs 15 of the end parts against turning about the central longitudinal axis of the axle beam and against transverse movement in the lengthwise direction of the axle beam.

Outer extremities of the first limbs 14 of the end parts are reduced in diameter and shaped as collars to form the stub axle supports 3. Stub axles 18 are welded into the stub axle supports co-axially with the first limbs 18.

Figure 2:
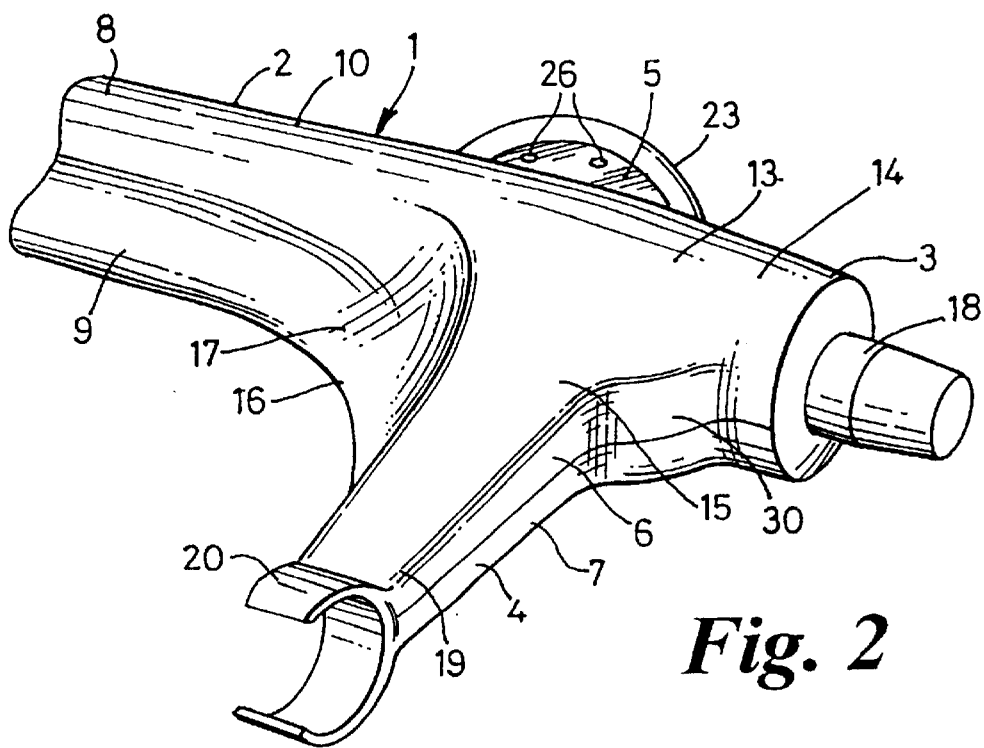
FIG. 2 is an enlarged top perspective view from the rear of part of the axle.

Continuing co-axially from the second limbs 15 of the end parts 3 are extensions 19 which continue and taper the substantially square hollow cross-section of the second limbs. The second limbs and extensions 19, in combination, form the trailing arms 4. Outer ends of the extensions 18 are similarly formed as arcuate cradles 20. FIG. 2, the arcs of the cradles of the two trailing arms being centred on a common axis extending transversely of the arms parallel to the central longitudinal axis of the axle beam 2. Welded into the cradles 20 are co-axial cylindrical housings 21 of pivot bearings 22 by which the trailing arms are pivoted on a vehicle. The axial spacing of the pivot bearings 22 on the trailing arms may be adjusted at the cradles to suit the intended installation of the axle for use, before the pivot bearings are welded to the cradles.

Figure 4:
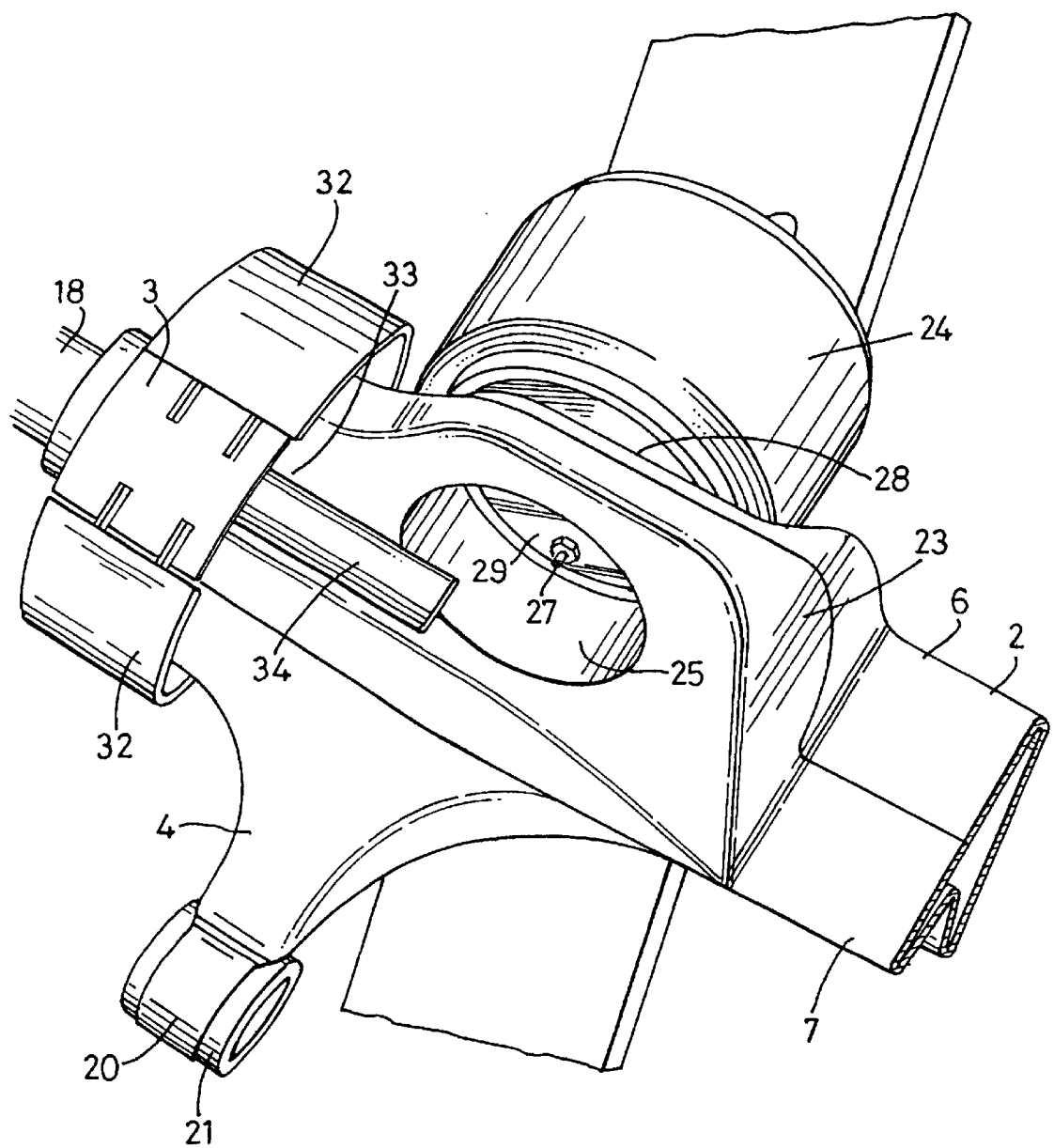

At the opposite side of the axle beam from the trailing arms 4, and respectively substantially opposite the trailing arms, the monocoque structure has two lateral seating protrusions 2 which provide the seatings 5 for a pair of air springs 24, as shown in FIGS. 3 and 4. Each seating 5 is defined by the bottom of a flat-bottomed depression in the top of the respective seating protrusion 23, the bottom lying in a plane close to, and parallel to, the central horizontal plane of the monocoque structure of the rigid member 1. Each seating protrusion 23 has a hollow 25, FIG. 4, extending from its underside to just below the seating 5. Bolt holes 26, FIGS. 1 and 2, are drilled through the seating 5 for bolts 27 fixed to a base plate 28, FIG. 4, of the respective air spring 22 to be inserted through and retained by nuts 29 applied to the bolts in the hollow 25.

As illustrated, each air spring 24 is of a cylindrical form. In such an arrangement a damper, not shown, may be attached to a bracket fixed on each seating protrusion 23 alongside the respective air spring. In an alternative arrangement, each air spring may be toroidal with annular fixing plates at top and bottom, the bottom fixing plate being bolted, as before, to the seating 5 of the respective seating protrusion 23. In this case, a damper may be positioned centrally in the toroidal shape of each of the air springs, to extend through the air spring. A bracket would be fixed on the seating 5 to connect the damper to the seating protrusion.

In the angle between the first and second limbs 14, 15 of each end part 13 of the axle beam 2 a protruberance 30 is formed as an integral part of the monocoque structure of the axle beam. Fixed on the protruberance 30 is a brake bracket 31, FIG. 3, on which brake shoes 32 of a drum brake are pivotally mounted.

At the opposite side of the axle beam from the protruberances 30, a prominence 33 is formed as part of the monocoque structure at the heel of the L-shape of each end part 13. The prominence 33 extends between the first limb of the end part and the adjacent seating protrusion 21 and merges into them with concavely rounded curves. Fixed on each prominence 33 is a cramshaft tube 34, FIG. 4, in which a camshaft, not shown, is housed for operating the brake shoes 32 of the respective drum brake. Instead of the camshaft tube 34, a camshaft bracket may be fixed on each protruberance 33 for supporting a camshaft for operating the brake shoes.

The monocoque structure may also be formed with integral locations for other fittings, for example brackets to receive trailing and/or leading links and/or anti-roll bars and an ABS sensor.

The member 1 may be fitted with all the component parts which it is to carry for use, before it is installed for use in a vehicle, thereby facilitating the installation process.

An axle made in accordance with the embodiment described has been found to provide substantial torsional compliance from strain within the material of the monocoque structure of the member 1 and from warping of the T-shaped section of the main part 8 of the axle beam 2. This allows roll compliance which is a particular advantage in a trailer vehicle suspension and requires less damping than in conventional axle systems. In addition, the forming of the trailing arms with the axle beam as integral parts of member 1 gives the axle the substantial benefit of combining in the one structure the normal axle function with an anti-roll function of the suspension. Traditionally, these functions have been achieved only by attaching separately made trailing arms to an axle beam, either by welding or a combination of welding and U-bolts, which has involved considerably more production work and cost.

Furthermore, the monocoque structure may be made relatively light in weight with the result that a substantial saving can be achieved in the overall weight of a suspension system in which the structure is included.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vehicle axle comprising a hollow monocoque structure comprising at least one integral location formed in the structure as a low stress seating area to receive an attachment thereto and a pair of trailing arms formed as a portion of said hollow monocoque structure, said hollow monocoque structure comprising a hollow cross-section which extends in a bending force direction of the axle.

2. A vehicle axle according to claim 1 in which the monocoque structure comprises one or more compliant portions.

3. A vehicle axle according to claim 2 in which each compliant portion is rigid in at least one direction of application of a force and compliant in at least one substantially orthogonal direction.

4. A vehicle axle according to claim 1 in which the monocoque structure includes a torsionally compliant part.

5. A vehicle axle according to claim 1 in which the hollow cross-section comprises three or more lobes.

6. A vehicle axle according to claim 5 in which the monocoque structure comprises a hollow T-shaped cross-section.

7. A vehicle axle according to claim 1 in which the wall thickness of the monocoque structure varies.

8. A vehicle axle comprising a hollow monocoque structure comprising at least one integral location formed in the structure as a low stress seating area to receive an attachment thereto and a pair of trailing arms formed as a portion of said hollow monocoque structure, said hollow monocoque structure rounded where walls thereof meet.

9. A vehicle axle according to claim 1 in which the monocoque structure includes a stub axle.

10. A vehicle axle comprising a hollow monocoque structure comprising at least one integral location formed in the structure as a low stress seating area to receive an attachment thereto and a pair of trailing arms formed as a portion of said hollow monocoque structure, said hollow monocoque structure comprises a cavity to receive a drive and differential gearing assembly.

11. A vehicle axle comprising a hollow monocoque structure comprising at least one integral location formed in the structure as a low stress seating area to receive an attachment thereto and a pair of trailing arms formed as a portion of said hollow monocoque structure, said hollow monocoque structure comprises a parallelogram structure to provide a cross beam such that said monocoque structure has cantilever beams integrally formed therewith which are positioned to be above and below a central horizontal axis of said monocoque structure when the axle is installed for use.

12. A vehicle axle comprising a hollow monocoque structure comprising at least one integral location formed in the structure as a low stress seating area to receive an attachment thereto and a pair of trailing arms formed as a portion of said hollow monocoque structure; and a multilink beam axle suspension in which links are formed integrally with the monocoque structure.

13. A vehicle axle according claim 1 wherein said trailing arms extend perpendicular to said monocoque structure.

14. A vehicle axle according to claim 13 in which each arm includes a cradle for a pivot bearing.

15. A vehicle axle according to claim 13 in which the monocoque structure further comprises a brake bracket at a juncture of the arm and axle beam, said brake bracket mounted away from a load part of the beam.

16. A vehicle axle according to claim 1 in which the location or one of the locations forms an anchorage for an air spring unit.

17. A vehicle axle comprising a hollow monocoque structure comprising at least one integral location formed in the structure as a low stress seating area to receive a support for a brake camshaft; and a pair of trailing arms formed as a portion of said hollow monocoque structure.

18. A vehicle axle comprising a plurality of hollow monocoque structures, at least one of said plurality of hollow monocoque structures comprising at least one integral formed in the structure as a low stress seating area to receive an attachment thereto; and a pair of trailing arms formed as a portion of said hollow monocoque structure.

19. A vehicle axle comprising a first and a second hollow monocoque structure secured to an intermediate sections, at lest one of said first and second hollow monocoque structures comprising at least one integral location formed in the structure as a low stress seating area to receive an attachment thereto; and a pair of trailing arms formed as a portion of said hollow monocoque structure.

20. A vehicle axle comprising:
an axle beam formed as a hollow monocoque structure comprising at least one integral location formed in the structure as a low stress area; and
a pair of trailing arms extending from said axle beam, said pair of trailing arms formed as a portion of said hollow monocoque structure.

21. The vehicle axle according to claim 20 wherein said monocoque structure comprises a hollow portion comprising three or more lobes in cross-section.

22. The vehicle axle according to claim 21 wherein said hollow portion extends in a main bending force direction.

23. A vehicle axle according to claim 20 wherein said monocoque structure comprises a torsionally compliant part.

24. A vehicle axle according to claim 23 wherein said torsionally compliant part comprises a hollow angled portion in cross-section.

25. A vehicle axle according to claim 23 wherein said torsionally compliant part comprises a hollow lobed portion in cross-section.

26. A vehicle axle according to claim 20 further comprising a cradle extending from each of said pair of trailing arms.

27. A vehicle axle according to claim 20 further comprising a cylindrical housing mounted within said cradle.

28. A vehicle axle comprising:
an axle beam formed as a hollow monocoque structure;
a stub axle extending from opposed ends of said hollow monocoque structure; and
a pair of trailing arms extending in a perpendicular relationship from said axle beam, said pair of trailing arms formed as a portion of said hollow monocoque structure.

29. The vehicle axle according to claim 28 wherein said monocoque structure comprises a hollow portion comprising three or more lobes in cross-section.

30. The vehicle axle according to claim 29 wherein said hollow portion extends in a main bending force direction.

31. A vehicle axle comprising a hollow monocoque structure having a hollow cross-section which extends in a main bending force direction and comprises three or more lobes, said hollow monocoque structure comprising at least one integral location formed in the structure as a low stress seating area to receive an attachment thereto.

32. A vehicle axle comprising a hollow monocoque structure comprising one or more arms extending perpendicular to said monocoque structure comprising at least one integral location formed in the structure as a low stress seating area to receive an attachment thereto and a brake at a juncture of the monocoque structure and the one or more arms, said brake bracket mounted away from a load part of the beam.

33. A vehicle axle according to claim 1 wherein said hollow monocoque structure comprises a first and a second portion which are joined along a substantially horizontal plane.

34. A vehicle axle according to claim 20, wherein said hollow monocoque structure comprises a first and a second portion which are joined along a substantially horizontal plane.

35. A vehicle axle according to claim 28 wherein said hollow monocoque structure comprises a first and a second portion which are joined along a substantially horizontal plane.

* * * * *

UNITED STATES PATENT AND TRADEMARK OFFICE
CERTIFICATE OF CORRECTION

PATENT NO.     : 6,543,857 B1                                               Page 1 of 1
DATED          : April 8, 2003
INVENTOR(S)    : Griffiths et al.

It is certified that error appears in the above-identified patent and that said Letters Patent is hereby corrected as shown below:

Column 6,
Line 64, "lest" should be -- least --.

Signed and Sealed this

First Day of July, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,543,857 B1
DATED        : April 8, 2003
INVENTOR(S)  : Griffiths et al.

It is certified that error appears in the above-identified patent and that said Letters Patent is hereby corrected as shown below:

<u>Title page,</u>
Please insert:
-- Foreign Application Priority Data
[30]   Oct. 28, 1999   (GB) ..................... GB9925415.3 --

Signed and Sealed this

Sixteenth Day of September, 2003

JAMES E. ROGAN
*Director of the United States Patent and Trademark Office*